United States Patent [19]

Curatolo et al.

[11] Patent Number: 4,640,976

[45] Date of Patent: Feb. 3, 1987

[54] PROCESS FOR THE MANUFACTURE OF POLYAMIDE FROM DIAMINE AND DIAMIDE UTILIZING OXYGENATED COMPOUND OF CARBON, BORON, NITROGEN AND SULFUR AS CATALYST

[75] Inventors: Benedict S. Curatolo, Maple Heights; Robert C. Sentman, Macedonia; Gerald P. Coffey, Lyndhurst, all of Ohio

[73] Assignee: The Standard Oil Company, Cleveland, Ohio

[21] Appl. No.: 763,867

[22] Filed: Aug. 9, 1985

[51] Int. Cl.$^4$ .................... C08G 69/00; C08G 69/28
[52] U.S. Cl. .................................. 528/336; 528/337
[58] Field of Search ........................................ 528/336

[56] References Cited

U.S. PATENT DOCUMENTS 4,543,407 9/1985 Curatolo et al. .................... 528/336

*Primary Examiner*—Harold D. Anderson
*Attorney, Agent, or Firm*—David P. Yusko; John E. Miller; Larry W. Evans

[57] ABSTRACT

Nylon-type polyamides are produced from a diamine and a diamide in contact with an oxygenated compound of carbon, boron, nitrogen or sulfur catalyst. For example, high quality nylon-6,6 is manufactured by contacting hexamethylenediamine and adipamide in water with an oxygenated compound of carbon, boron, nitrogen or sulfur at an elevated temperature and pressure.

17 Claims, No Drawings

4,640,976

PROCESS FOR THE MANUFACTURE OF POLYAMIDE FROM DIAMINE AND DIAMIDE UTILIZING OXYGENATED COMPOUND OF CARBON, BORON, NITROGEN AND SULFUR AS CATALYST

BACKGROUND OF THE INVENTION

1. Field of the Invention

This invention relates to polyamides. In one aspect, the invention relates to a process for manufacturing polyamides from $\alpha,\omega$-diamine and an $\alpha,\omega$-diamide while in another aspect, the invention relates to a process utilizing an oxygenated compound of carbon, boron, nitrogen or sulfur as a catalyst. In still another aspect, the invention relates to an improved process for manufacturing nylon-6,6 from hexamethylenediamine and adipamide utilizing a catalyst system composed of an oxygenated compound of carbon, boron, nitrogen or sulfur.

2. Description of the Prior Art

It is known in the art that commercially available nylons may be prepared by polymerization of various monomers and combinations of monomers. For example, various nylons may be prepared from the polymerization of diamines with dicarboxylic acids, the polymerization of dinitriles with diamines in the presence of water, the polymerization of aminonitriles in the presence of water, or the polymerization of lactams.

In part, the instant invention deals with nylons resulting from the polymerization from diamines and diamides. Very few references suggest the polymerization of these two monomer types. For example. U.S. Pat. No. 3,900,450 teaches a process for polymerizing amino acids, diamines, dibasic carboxylic acids and other amide forming derivatives in which diamides are specifically included.

Recently, Curatolo et al., U.S. application Ser. No. 677,262 disclosed a catalytic process for the manufacture of polyamides from diamines and diamides using an oxygenated phosphorus compound, such as the alkali metal salts of phosphoric acid, as a catalyst. These oxygenated phosphorus compounds sometimes yielded poor thermal stability in the resulting polyamide. An advantage to the catalysts of the instant invention is that they provide good thermal stability for polyamides produced by the polymerization of diamines and diamides.

Lastly, the instant invention relates to the production of nylon-6,6 from hexamethylenediamine and adipamide. Commercially, nylon-6,6 is produced from hexamethylenediamine and adipic acid. The present invention offers an alternative to the adipic acid route in preparing this most useful polymer.

SUMMARY

Nylon-type polyamides suitable for fibers, plastics, films and molding compounds are produced in a process comprising polymerizing an $\alpha,\omega$-diamine, and an $\alpha,\omega$-diamide in the presence of a catalyst comprising an oxygenated compound of carbon, boron, nitrogen or sulfur. In one embodiment, nylon-6,6 is produced by contacting hexamethylenediamine and adipamide in water and in the presence of a catalyst comprising an oxygenated compound of carbon, boron, nitrogen or sulfur.

DETAILED DESCRIPTION OF THE INVENTION

Monomers:

The $\alpha,\omega$-diamines here used are of the formula $$R'HN-R-NHR' \qquad (I)$$

where R is a divalent organic radical and each R' is independently hydrogen or a univalent organic radical. R can be a divalent aliphatic, alicyclic or aromatic radical and these radicals can bear one or more inert substituents. Similarly, each R' can be independently a hydrogen or a univalent aliphatic, alicyclic or aromatic radical and each one of these radicals can also bear one or more inert substituents. By the term "inert" is meant that the substituent is essentially nonreactive with the reactants, catalysts and products of the process under process conditions. Typically, R is a divalent $C_1$–$C_{20}$ aliphatic radical, a divalent $C_5$–$C_{18}$ alicyclic radical or a divalent benzene radical and preferably R is a $C_2$–$C_8$ straight chain alkylene radical. Typically, R' is hydrogen or a $C_1$–$C_{20}$ aliphatic radical, $C_5$–$C_7$ alicyclic or a phenyl radical. Preferably, R' is hydrogen or a $C_1$–$C_4$ alkyl radical. Representative diamines include tetramethylene diamine, hexamethylenediamine, p-diaminodicyclohexylmethane, 4,4'-diaminodicyclohexyl ether, 4,4'-diaminodicyclohexyl sulfide, 4,4'-diaminodicyclohexyl sulfone, octamethylene diamine, decamethylene diamine, dodecamethylene diamine, m-xylylenediamine, 1,4-dimethyleneamino-1-phenyl-1,2,3,4-tetrahydronaphthalene and the like. Hexamethylenediamine is an especially preferred diamine.

The diamides here used are of the formula

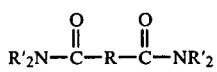

(II)

where R and each R' are as previously defined. Representative diamides include malonamide, succinamide, glutaramide, adipamide, terephthalamide and isophthalamide. Adipamide is an especially preferred diamide.

The instant invention is substantially aimed at the production of polyamides from diamines and diamides. However, other polyamides can also be prepared by the instant process by the polymerization of a major proportion of diamines, and diamides with minor proportions of other polyamide forming compounds. Representatives of other polyamide forming compounds are lactams, such as caprolactam, valerolactam, undecalactam; amino carboxylic acids; aliphatic and aromatic dicarboxylic acids, such as adipic acid, succinic acid, sebacic acid, isophthalic acid and terephthalic acid; and aliphatic and aromatic dinitriles, such as glutaronitrile, succinonitrile, adiponitrile, suberonitrile, sebaconitrile, 1,10-decane dinitrile, methyl glutaronitrile, $\alpha$-methylene glutaronitrile and 1,4-dicyano-1-phenyl-1,2,3,4,-tetrahydronaphthalene.

Also polymerizable with the catalyst of the instant invention are omega-aminoamides of the formula

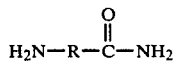

where R is as previously defined.

The Catalyst:

The hallmark of the instant invention is the oxygenated compounds of carbon, boron, nitrogen or sulfur, or combinations thereof, which are used as catalyst. The oxygenated compounds are characterized as having at least one atom of carbon, boron, nitrogen, or sulfur in combination with one or more atoms of oxygen in addition to other atoms and functional groups.

The oxygenated carbon compounds suitable for use as catalysts in the invention include carbonates and derivatives thereof, such as $H_2CO_3$, ammonium carbonate, ammonium alkyl carbonate salts, metal carbonate salts, and carbonate esters. Representative of the metal carbonate salts are the salts of Group IA and IIA. Representative of the carbonate esters are dimethyl carbonate, diphenyl carbonate and diethyl carbonate.

Preferred carbonate compounds include ammonium carbonate, sodium carbonate, calcium carbonate, and dimethyl carbonate. An advantage of some of these carbonate compounds is that they are volatilized at the end of the reaction (during a venting or purge step) and, therefore, leave no catalyst residue in the polyamides produced.

The oxygenated boron compounds suitable for use as catalysts in the invention include boric acid, boric anhydride, salts of boric acid or boron anhydride, and esters of boric acid. Representative of the oxygenated boron compounds are boric acid, sodium tetraborate ($Na_2B_4O_7$) and trimethyl borate. An advantage to using the oxygenated boron compounds as catalyst, such as boric acid, is that polyamides with good thermal stability and excellent color result.

The oxygenated nitrogen compounds suitable for use as catalysts in the invention include aromatic nitro-compounds and nitrate salts. Representative aromatic nitro-compounds are nitrobenzene, ortho-dinitrobenzene, meta-dintrobenzene and para-dinitrobenzene. Representative nitrate salts are ammonium nitrate and the nitrate salts of Group IA such as $LiNO_3$. An advantage to using the oxygenated nitrogen compounds, especially the non-acidic organic nitro-compounds such as nitrobenzene, is that polyamides with good thermal stability are produced.

The oxygenated sulfur compounds suitable for use as catalyst in the invention include sulfuric acid, sulfurous acid, sulfur dioxide, sulfur trioxide, alkyl and aryl substituted sulfonic acid, alkyl and aryl substituted sulfinic acid and alkyl and aryl substituted sulfenic acid., as well as the alkyl, aryl, and alkyl/aryl esters, metal salts, ammonium salts, and ammonium alkyl salts of these various sulfur containing compounds. The esters are formed conventionally with the alkyl or aryl group replacing the hydrogen of an —OH group comprising the acid. Sulfoxides, sulfones, sulfates, pyrosulfates, sulfites, pyrosulfites, sulfonates and sulfinates are included in the oxygenated sulfur compounds suitable for use as catalysts in the invention.

In order to clarify some of the compounds named above, the structures of several of the oxygenated sulfur compounds are:

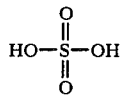

sulfuric acid

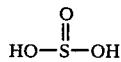

sulfurous acid

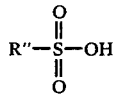

substituted sulfonic acid

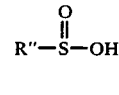

substituted sulfinic acid

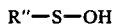

substituted sulfenic acid where each R" is independently an alkyl or aryl radical.

Preferred oxygenated sulfur compounds are sulfuric acid, p-toluenesulfonic acid, and the sodium or lithium salts of sulfuric or p-toluenesulfonic acids. These salts may be added initially or generated in situ by the addition of NaOH or LiOH to a reaction mixture already containing the oxygenated sulfur compound at a time late in the reaction cycle. An advantage to using the oxygenated sulfur compounds as catalyst is that polyamides with good thermal stability are produced.

Sufficient catalyst is employed to promote the polymerization of the diamine and diamide. A typical amount of catalyst is between 0.0001 and 1 weight percent, based upon the total weight of the diamine, diamide, and water. Catalyst levels of about 0.001 to about 1 weight percent are preferred.

The manner in which the catalyst is added to the monomers can vary. e.g. addition of each component separately to a mixture of monomers or added as a mixture to one of the monomers prior to admixture with the other monomer.

Process Parameters:

High molecular weight, linear polyamides are prepared by forming a reaction mixture of the diamine, diamide, water and catalyst. This reaction mixture can be formed by any one of a number of different methods. One method is the gradual addition, either continuously or incrementally, of the diamine to the diamide over the course of the polymerization. Typically, in this method less than 50 mole percent of the diamine, preferably less than 5 mole percent, is admixed with the diamide with the remainder of the diamine added gradually over the course of polymerization. Another method and one preferred due to its simplicity of operation is a batch addition of all reactants at the commencement of the reaction.

The reaction itself is preferably conducted in a batch mode. However, the reaction can also be conducted in a continuous mode, i.e. continual addition of the reactants with concomitant removal of product, if desired. An example of a continuous mode process is the use of a cascade reactor arrangement.

Theoretically, water is not necessary to the process as reactant, but in practice it has been found that it is beneficial to the production of high molecular weight polyamides. Consequently, water is typically employed in the reaction mixture during the polymerization. Since the water will have to be removed from the reaction product at the end of the polymerization, preferably the amount of water is kept to a minimum (20 weight percent or less) to facilitate ultimate removal. Moreover, the less water present during the polymerization generally means the less energy needed for the process and consequently, less expensive process equipment can be employed. The manner in which the water is initially introduced into the reaction mixture is not important to the practice of this invention and it can thus be either added alone or in combination with the diamine or diamide. Additionally, other solvents or diluents may be used in the process as an alternative to water.

Ammonia is a byproduct of the reaction of the diamine and diamide. As a consequence, ammonia is constantly being generated within the reaction mixture but it typically enters the vapor phase and is preferably continuously removed from reaction zone (e.g. released through a pressure relief valve on the reaction vessel). The concentration of ammonia in the reaction mixture (which is a liquid) can vary from threshold detection limits up to about 5 weight percent of the total weight of the reaction mixture. Preferably, the concentration of ammonia in the liquid reaction mixture does not exceed 1 weight percent and more preferably, is kept as low as possible.

In one embodiment of this invention, high quality nylon-6,6 resin is prepared from hexamethylenediamine and adipamide in water by continuously removing substantially all of the ammonia generated during the polymerization but while retaining all of the water. The water is eventually removed from the reaction system after low molecular weight polyamides are formed.

The polymerization of a diamine and a diamide to form a high molecular weight, linear polyamide is best conducted over a temperature/pressure profile that varies over the course of the polymerization. The temperature/pressure profile will, of course, vary with the specific reactants employed as well as with such factors as the nature and amount of catalysts, mode of operation (batch versus continuous), configuration of the reaction vessel, etc. For the manufacture of nylon-6,6 from hexamethylenediamine and adipamide in water, a temperature/pressure profile comprising at least two stages is typically employed, both preferably conducted in the absence of air ($O_2$). During the first stage of the polymerization, the temperature is mantained at 180°-300° C., preferably 200°-270° C. under autogenous pressure (typically about 200 to about 800 psi absolute) for a period of time sufficient to form low molecular weight polyamides. e.g. polyamides having a weight average molecular weight of less than about 10,000, generally less than about 5,000 as measured by intrinsic viscosity. Ammonia is removed from the reaction vessel while maintaining the water concentration at a level sufficient to aid polymerization, typically in excess of 14 weight percent. At the completion of the first stage (which is the start of the second stage), the pressure is gradually reduced to atmospheric or subatmospheric pressure and the temperature is gradually increased, preferably to between about 260°-295° C. During this second stage, relatively low molecular weight polyamides are combined to form the high molecular weight polyamides that constitute the final product of the process. The second stage is typically concluded with a sweep or purge of the reaction vessel with a flow of inert gas, such as nitrogen.

In one embodiment of this invention, the molecular weight of the polyamide can be increased by performing the polymerization at a temperature just below the lowest temperature at which either the catalyst, monomers or final polyamide begin to degrade.

Although the polymerization is initially conducted at autogenous pressure with a later reduction to atmospheric or subatmospheric pressure, the process can be conducted at constant pressure by applying an inert gas pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

The Polyamide:

The polyamides produced by this invention are solid high molecular weight products having a nylon structure, i.e. amide linkages (—CONH—) as an integral part of the polymer backbone, as opposed to polyacrylamides which have an essentially all carbon backbone. These polyamides can be used in any application calling for the use of a nylon-type polymer. For example, these polyamides can be used as fibers, plastics, films and molding compounds.

When an oxygenated compound of carbon, boron, nitrogen or sulfur is used as a catalyst, the polyamides typically have good thermal stability, and depending upon the choice of catalyst, also have excellent color. Further, the polyamides produced by the catalysts of the instant invention are characterized by relatively high onset decomposition temperatures (ODT). This property is directly related to the stability of the polymer. the higher the ODT, the more thermally stable the polyamide. Typically, the polyamides produced by this invention have an ODT higher than about 330° C. which is of economic value in the marketplace since such polyamides will undergo less thermal degradation during processing. For example, fiber spinning apparatus will require less down time for cleaning when processing a relatively high ODT polyamide than when processing a lower ODT polyamide. In addition, thermal gravimetric analysis (TGA) shows that the polyamides made by this invention have relatively low weight loss.

The polyamides produced by this invention are believed to contain few, if any, defect structures. A defect structure is simply a branch or side chain attached to the polymer backbone which is formed when a monomer, oligomer or low molecular weight polymer attaches to the polymer backbone as a pendent substituent rather than as an integral part of the backbone itself. Although these defect structures may be present in relatively low concentrations, even in extremely low concentrations, even parts per million, their presence can confer undesirable thermal instability to the polyamide. The practice of this invention reduces the formation of defect structures to the polyamide to a minimum.

This invention is particularly well adapted to manufacturing high quality nylon-6,6 polymer from hexamethylenediamine and adipamide, in contact with the catalyst and water. However, this invention is also useful for the manufacture of nylon-4,4; nylon-4,6; and nylon-6,4 (from the appropriate diamines and diamides).

The following examples are illustrative of various embodiments of this invention. Unless noted to the contrary. all parts and percentages are by weight.

SPECIFIC EMBODIMENTS

Examples 1-19

All examples were run in a Parr autoclave (450 ml) equipped with an anchor agitator. The reactor was charged with adipamide (72.09 g, 0.5 moles), hexamethylenediamine (58.15 g, 0.5004 moles), water (33.51 g, 1.86 moles) and catalyst. The reactor was then purged with nitrogen, sealed and connected to a back-pressure regulator adjusted to 750 psi absolute. The reaction mixture was then heated with stirring to 260° C. The reaction temperature/pressure profile was as follows: Five minutes at 260° C. and 750 psi, 15 minutes at 260°-280° C. while venting to atmospheric pressure, and then 10 minutes at 260°-280° C. with the reactor swept with nitrogen. The reactor was then cooled to room temperature under a positive nitrogen pressure. Nylon-6,6 polymer was recovered from the reactor and ground to a size such that it would pass through a ten mesh (U.S. Standard) screen. Melting point and onset decomposition temperature (ODT) was measured by differential scanning calorimetry (DSC). Weight loss was measured by thermal gravimetric analysis (TGA). Intrinsic viscosity was determined in formic acid (90 weight percent) at 25° C. Bulk viscosity was the time required for 0.415 g of polymer dissolved in 2 ml of 90 percent formic acid to traverse 0.8 ml in a 1 ml pipette at room temperature.

Identification of catalysts and the results are reported in Table I.

TABLE I
NYLON-6,6 PREPARATION FROM ADIPAMIDE AND HEXAMETHYLENEDIAMINE

| Example Number | Catalyst | Catalyst Conc. (Mole %) | Bulk Viscosity (Seconds) | Intrinsic Viscosity (DL/G) | TGA WT Loss (%) 325-390° C. | DSC Onset Decomp. Temp Degrees C. | DSC Melting Point (°C.) |
|---|---|---|---|---|---|---|---|
| 1 | none | none | 11.97 | 0.74 | 2.2 | 360 | 264 |
| 2 | $(NH_4)_2CO_3$ | 0.146 | 21.23 | 1.10 | 2.2 | 340 | 263 |
| 3 | $Na_2CO_3$ | 0.146 | 14.13 | 0.78 | >8.8 | 335 | 262 |
| 4 | $(CH_3O)_2CO$ | 0.146 | 16.14 | 0.87 | 2.35 | >315 | 260 |
| 5 | $H_3BO_3$ | 0.146 | 22.38 | 1.12 | 3.1 | 310 | 262 |
| 6 | $Na_2B_4O_7$ | 0.146 | 25.30 | 1.06 | >7.3 | 360 | 263 |
| 7 | $LiNO_3$ | 0.146 | 17.76 | 1.03 | 6.2 | 330 | 262 |
| 8 | $C_6H_5NO_2$ | 0.146 | 20.54 | 1.08 | 1.4 | 340 | 261 |
| 9 | $CH_3C_6H_4SO_3H$ | 0.146 | 21.55 | 1.11 | 2.1 | 360 | 264 |
| 10 | $H_2SO_4$ | 0.146 | 28.59 | 1.08 | 2.5 | >340 | 264 |
| 11 | $Na_2SO_4$ | 0.146 | 19.18 | 0.98 | 2.5 | >350 | 263 |

Since viscosity is proportional to molecular weight, Table I illustrates that polyamides produced from diamines and diamides using the catalytic process of the instant invention have greater viscosities and consequently greater molecular weight than polyamides produced using an identical process without a catalyst.

Although the invention has been described in considerable detail through the preceding examples, these examples are for the purpose of illustration only and one skilled in the art will understand that variations and modifications can be made without departing from the spirit and scope of the invention.

The claimed invention is:

1. A process for the manufacture of a polyamide comprising polymerizing an α,ω-diamine, an α,ω-diamide in contact with a catalyst at an elevated temperature and pressure, wherein the catalyst comprises an oxygenated compound selected from the group consisting of oxygenated compounds of carbon, oxygenated compounds of boron, oxygenated compounds of nitroen, oxygenated compounds of sulfur, and mixtures thereof.

2. The process of claim 1, wherein the α,ω-diamine, the α,ω-diamide and the catalyst are contacted in water.

3. The process of claim 1, wherein the catalyst comprises an oxygenated compound of carbon.

4. The process of claim 3, wherein the oxygenated compund of carbon is carbonate or derivative thereof.

5. The process of claim 4, wherein the oxygenated compound of carbon is selected from the group consisting of $H_2CO_3$, ammonium carbonate, ammonium alkyl carbonate salts, metal carbonate salts and carbonate esters.

6. The process of claim 1, wherein the catalyst comprises an oxygenated boron compound.

7. The process of claim 6, wherein the oxygenated boron compound is boric acid, boric anhydride, salts of boric acid or boric anhydride, or esters of boric acid.

8. The process of claim 1, wherein the catalyst comprises an oxygenated nitrogen compound.

9. The process of claim 8, wherein the oxygenated nitrogen compound is an aromatic nitrogen compound or nitrate salt.

10. The process of claim 1, wherein the catalyst comprises an oxygenated sulfur compound.

11. The process of claim 10, wherein the oxygenated sulfur compound is sulfuric acid; sulfurous acid; sulfur dioxide; sulfur trioxide; alkyl or aryl substituted sulfonic acid; alkyl or aryl substituted sulfinic acid; alkyl or aryl substituted sulfenic acid; alkyl, aryl or alkyl/aryl esters of sulfuric acid, sulfurous acid or sulfonic acid; the metal or ammonium salts of sulfuric acid, sulfurous acid or sulfonic acid; or the ammonium alkyl salts of sulfuric acid, sulfurous acid or sulfonic acid.

12. The process of claim 10 where the oxygenated sulfur compound is selected from the group consisting of sulfoxides, sulfones, sulfates, pyrosulfates, sulfites, pyrosulfites, sulfonates and sulfinates.

13. The process of claim 1 where the diamine is of the formula

$$R'HN-R-NHR' \qquad (I)$$

and where the diamide is of the formula

$$\underset{R'_2N-C-R-C-NR'_2}{\overset{O\quad\;\; O}{\underset{\|\quad\;\; \|}{}}} \qquad (II)$$

where each R is independently a divalent organic radical and each R' is independently hydrogen or a univalent organic radical.

14. The process of claim 13 where R is a divalent $C_1$-$C_{20}$ aliphatic, divalent $C_5$-$C_{18}$ alicyclic or divalent benzene radical and each R' is independently hydrogen, a univalent $C_1$-$C_{20}$ aliphatic, univalent $C_5$-$C_7$ alicyclic or a phenyl radical.

15. The process of claim 14 where R is a $C_2$-$C_8$ straight chain alkylene radical and R' is hydrogen or a $C_1$-$C_4$ alkyl radical.

16. The process of claim 15 where the diamine is hexamethylene diamine and the diamide is adipamide.

17. The process of claim 2 where the catalyst is present in an amount between about 0.0001 to about 1 weight percent based upon the total weight of the diamine, diamide and water.

* * * * *